UNITED STATES PATENT OFFICE.

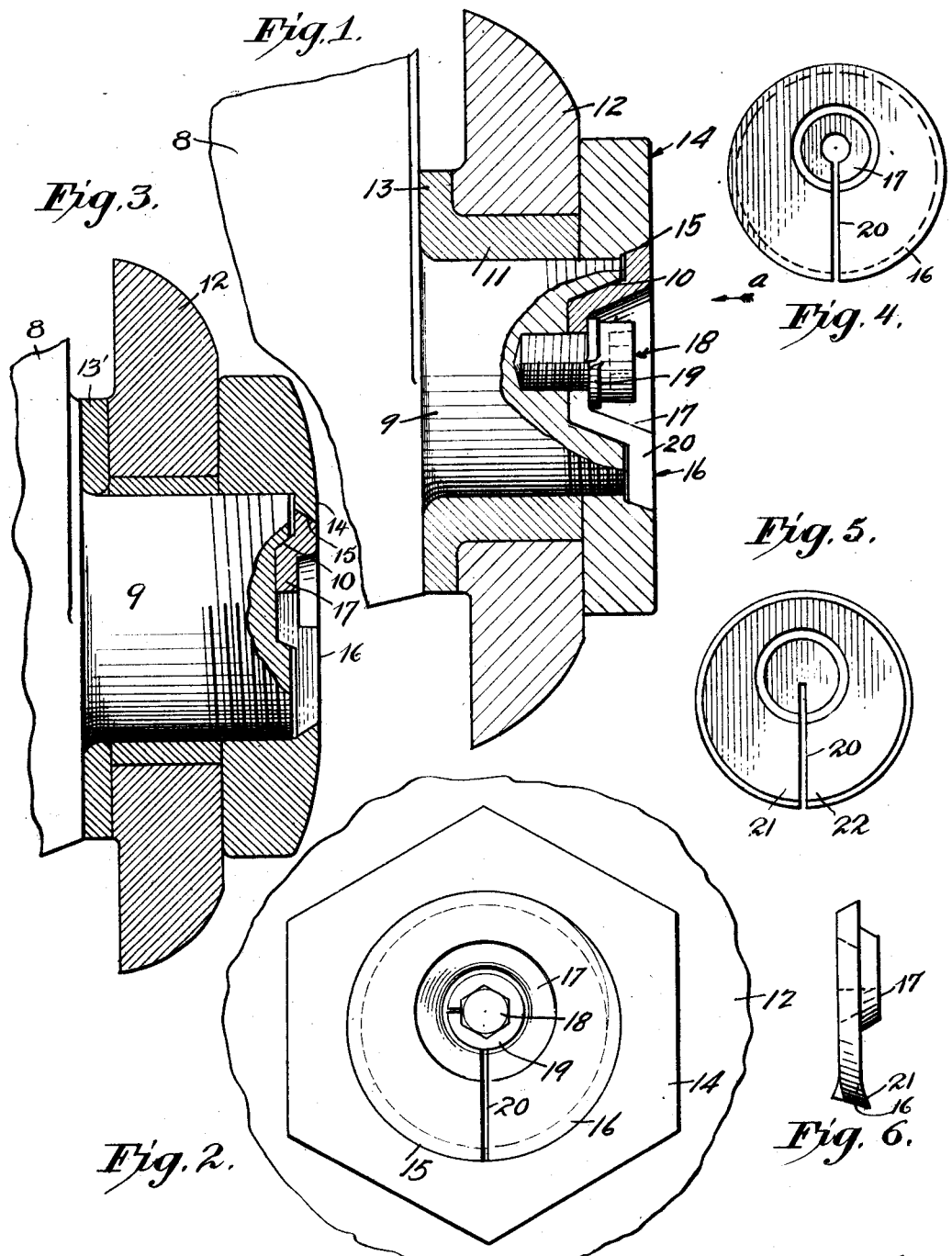

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

LOCK-NUT CONSTRUCTION.

1,179,314.   Specification of Letters Patent.   Patented Apr. 11, 1916.

Application filed July 25, 1914. Serial No. 853,197.

*To all whom it may concern:*

Be it known that I, HOWARD R. HUGHES, a citizen of the United States, residing at Houston, in the county of Harris, State of Texas, have invented new and useful Improvements in Lock-Nut Construction, of which the following is a specification.

My invention relates to a lock nut construction, and more specifically to a construction designed to be used in connection with bearings on which are mounted revoluble members.

It is the object of my invention to provide a lock nut construction which can be readily applied or taken apart without injury thereto.

A further object is to provide a device for locking a rotary cutting disk against accidental removal from its bearing, and by means of which the rotation of the disk will be prevented from loosening its bearing as well as obviating binding of the disk on the bearing.

The invention is illustrated in the accompanying drawings, in which:

Figure 1 is a view in vertical section of the cutting disk and its bearing, showing the device for locking the bearing and disk against displacement, and illustrating one form of the invention. Fig. 2 is an end view of the bearing and the locking device as seen in the direction indicated by the arrow —a— in Fig. 1. Fig. 3, is a detail sectional view illustrating another form of the bearing and the locking means therefor. Fig. 4 is a view in elevation of the locking disk illustrated in Figs. 1 and 2. Fig. 5 is a view in elevation of the locking disk shown in Fig. 3. Fig. 6 is an edge view of the locking disk.

More specifically, 8 indicates the bit shank or head, and 9 denotes a lateral stud or arbor formed thereon. The arbor 9 is threaded externally and is formed with a recess or depression 10 on its outer end which depression is circular in configuration and arranged eccentric to the axis of the arbor and formed with inclined side walls.

A bushing or sleeve 11 is mounted on the arbor on which a cutting disk 12 is revolubly mounted. In Fig. 1 the sleeve or bushing 11 is shown as slidably mounted on the arbor 9 and formed with an annular flange 13 on its inner edge which abuts against the shank 8 and serves as a spacer to separate the cutting disk 12 from the shank and also form an end bearing for the cutting disk.

In Figs. 1, 2, and 3 the cap nut 14 is shown as independent of the sleeve or bushing 11 and is threaded on the outer end of the arbor 9 to form an outer end bearing for the cutting disk 12 and at the same time serve to hold the cutting disk in place on the arbor. The cap nut 14 is formed with a central opening 15 concentric with the arbor 9, the side wall of which is beveled to incline outwardly as shown in Fig. 1, or to incline inwardly as shown in Fig. 5.

Means are provided for locking the cap nut 14 against accidental rotation to prevent its working loose on the arbor 9, or from advancing thereon against the cutting disk 12 and tending to bind the latter. This means comprises a locking disk 16 having a circular contour and having its periphery inclined to conform to the beveled wall of the aperture 15 in the cap nut 14. Formed on the locking disk 16 and extending rearwardly thereof is a circular projecting portion 17 which is arranged eccentric to the center of the locking disk 16 and is designed to extend into the recess or depression 10 formed in the end of the arbor 9. The projecting portion 17 is formed with a convergent or tapered outer wall adapted to conform to the inclined wall of the depression 10.

Where the walls of the aperture 15 in the cap nut 14 diverge outwardly as shown in Fig 1 it is necessary to provide means for securing the locking disk 16 against outward displacement on the stud 9. This means is here shown as consisting of a bolt 18 which passes through an opening in the extended portion 17 of the locking disk 16 and is screwed in the end of the arbor 9; the head of the bolt 18 bearing against a lock nut washer 19 placed adjacent the outer face of the locking disk 16 thereby retaining the locking disk in position.

Where the aperture 15 in the cap nut 14 is formed with an outwardly divergent inclination the wall of the aperture will engage the periphery of the locking disk 16 and thereby hold the latter in place as shown in Fig. 5.

The locking disk 16 is formed with a diametrically extending slot 20 which extends from the center of the tapered projecting portion 17 of the locking disk and opens to the outer edge thereof, and the portions of the locking disk forming the side walls of the outer portion of the slot 20 are bent in opposite directions in relation to each other to form resilient tongues 21 and 22, adapted to grip the end of the arbor 9 and the peripheral wall of the opening in the nut 14, when the nut is in place on the arbor, whereby an additional binding or gripping action is secured.

In the application of the invention as shown in Figs. 1 and 2, the sleeve or bushing 11 is placed on the arbor 9 with the cutting disk 12 thereon. The cap nut 14 is then screwed in place whereupon the locking disk is inserted in position on the end of the arbor; the projecting portion 17 of the disk extending into the eccentric depression 10 in the arbor 9, and the circular outer periphery of the locking disk engaging the beveled wall of the aperture 15 in the cap nut 14. The locking disk 16 is then locked against outward displacement by means of the bolt 18 as before described.

In assembling the form of the device shown in Fig. 5, the locking disk 16 is first placed in position on the arbor 9, whereupon the cutting disk 12 is placed in position and the cap nut 14 screwed on the arbor so that the beveled wall of the aperture 15 therein will engage the correspondingly beveled edge of the locking disk 16. As a means for holding the disk 16 against rotation during the tightening of the cap nut 14 thereagainst a suitable tool is engaged with the slot 20.

In the operation of the invention, rotation of the cap nut 14 is effectively inhibited by reason of the pivotal mounting of the locking disk 16 formed by the eccentric projection 17 engaging the arbor 9 to one side of the axis of the arbor and cap nut and by reason of the frictional engagement between the edge of the locking disk and the wall of the circular aperture in the cap nut 14; this engagement being insured by the spring action of the portions 21 and 22 of the locking disk. Any tendency of the cap nut 14 to rotate in either direction operates to tend to rock the eccentrically mounted locking disk 16, but this movement is prevented by reason of the peripheral engagement by the cap nut 14 with the locking disk. The locking disk 16 will thus operate as a wedge to increase its peripheral engagement with the cap nut 14 and thereby effectively prevent rotation of the cap nut on its threaded mounting in either direction.

By removing the bolt 18 and the locking disk 16 in the form of the device shown in Fig. 1, the cap nut may be readily removed to permit removal of the cutting disk 12. To remove the cap nut 14 in the form of the device shown in Fig. 5, it is necessary to hold the locking disk 16 against movement by engagement therewith of a suitable tool to prevent the binding action of the locking disk.

What I claim is:

1. In a lock nut construction, a threaded arbor having an eccentric circular recess on its end face, a cap threaded on said arbor, said cap formed with a central circular aperture, a disk formed with an eccentric projecting portion adapted to extend into the recess in the arbor with its periphery in contact with the marginal wall of the aperture in the cap, and means for locking said last named disk against displacement.

2. In a lock nut construction, an arbor formed with a circular depression in its end face arranged eccentric to the axis of the arbor, a cap screwed on the arbor formed with a central aperture having an inclined wall, and a locking disk having an eccentric projecting portion extending into the depression on the arbor and arranged with its outer edge contacting the wall of the aperture in the cap.

3. The combination with an externally threaded arbor, having a circular eccentric depression formed on its end face, a cap screwed on said arbor, a locking disk having an eccentric projection extending into the depression in the arbor, and means coöperating between the locking disk and the cap coacting with the engagement of the locking disk and arbor whereby rotating of the locking disk and the cap is inhibited.

4. The combination with a threaded arbor having an eccentric circular depression in its outer end, a cap screwed on said arbor, a locking disk formed with an eccentric projection extending into the depression in the arbor, and connections between said locking disk and cap coöperating with the connections between the locking disk and the arbor, whereby rotation of the locking disk and cap is prevented.

5. The combination with an arbor formed with a circular depression in its end face arranged eccentric to the axis thereof, a nut screwed on the arbor, said nut formed with a central circular aperture concentric with the axis of the arbor, and a locking disk having an eccentric projecting portion extending into the depression on the arbor, said locking disk having a diametrically extending slot opening at the edge of the locking disk with the edge walls of the slots at its outer end bent in opposite directions, the outer edge of the locking disk adapted to contact the wall of the aperture in the cap.

In witness that I claim the foregoing I have hereunto subscribed my name this 3rd day of July, 1914.

HOWARD R. HUGHES.

Witnesses:
MARGUERITE BATES,
MARIE BATTEY.